350-6.2 SR
XR 2,922,894
SEARCH ROOM
SUBSTITUTE FOR MISSING XR
Jan. 26, 1960 K. KERR ET AL 2,922,894
INFORMATION STORAGE AND READOUT SYSTEM
Filed Nov. 27, 1956 3 Sheets-Sheet 1
FIG. 1
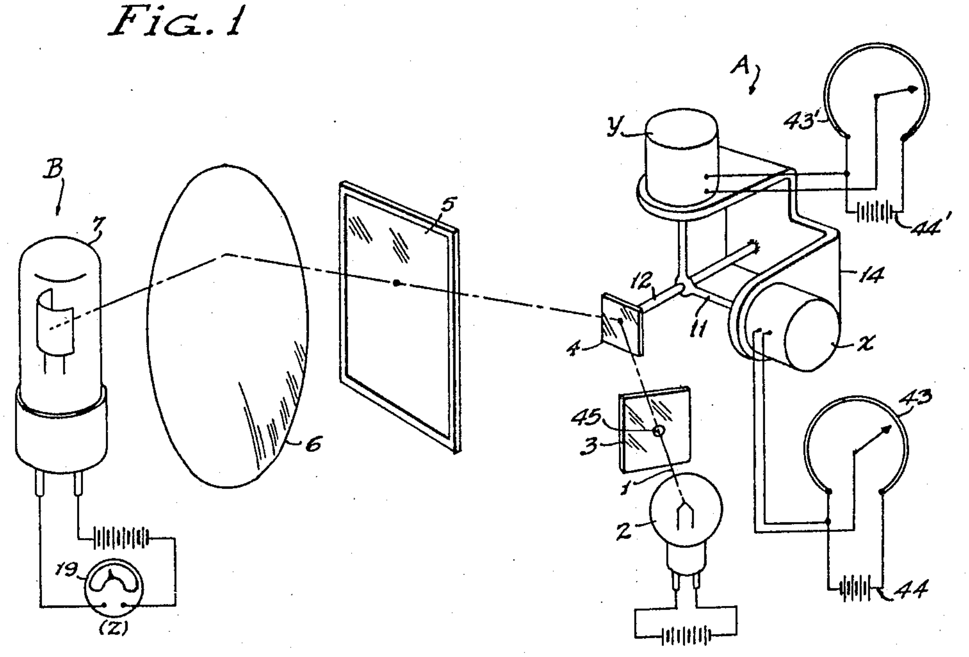
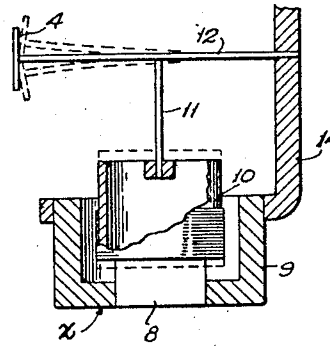
FIG. 3
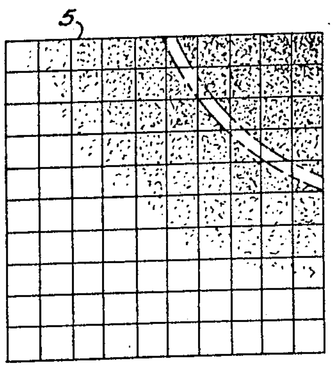
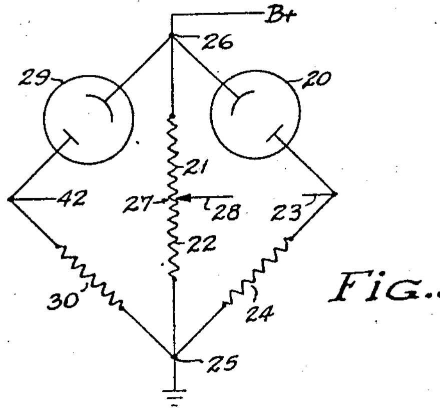
FIG. 2
FIG. 5
INVENTORS
KINGDON KERR
EDWARD HALITSKY
BY Lynn I. Latta
-ATTORNEY- INVENTORS
KINGDON KERR
BY EDWARD HALITSKY
Lynn H. Latta
-ATTORNEY- Jan. 26, 1960 K. KERR ET AL 2,922,894

INFORMATION STORAGE AND READOUT SYSTEM

Filed Nov. 27, 1956 3 Sheets-Sheet 3

INVENTORS
KINGDON KERR
EDWARD HALITSKY
BY Lynn H Latta
ATTORNEY

United States Patent Office 2,922,894

Patented Jan. 26, 1960

2,922,894

INFORMATION STORAGE AND READOUT SYSTEM

Kingdon Kerr and Edward Halitsky, Los Angeles, Calif.

Application November 27, 1956, Serial No. 624,656

9 Claims. (Cl. 250—219)

Our invention relates to an electro-optical device in which three dimensional information may be stored and from which the stored information may be read out at will.

The basic element of this information storage and readout device is a translucent data plate composed of relatively light and dark areas of varying densities located at predetermined distances from its edges. These relatively light and dark areas of varying densities are established from known factors and represent the data to be stored in the system. By the use of a suitably controlled light beam, any area on the plate may be selected and its density measured, thereby retrieving the data stored on the plate.

Storage of multiplication tables is a simple example of data storage. As this involves the product of two numbers, the density (darkness) is used to represent the product, while the two numbers are represented by the horizontal and vertical dimensions of the plate. Therefore, any function which can be represented by two independent variables, such as X and Y, and one dependent variable, such as Z, can be stored on the plate. Theoretical, mathematical as well as empirical data can be used and may represent physical quantities, numbers and codes. The data plates are readily inserted into and removed from the electro-optical system in which no changes are required to read out different types of data.

An object of our invention is to provide a mechanism composed principally of electrical, optical and mechanical elements in which three dimensional information may be stored and from which the stored information may be read out at will in the form of an electrical impulse.

A further object of our invention is to provide such an information storage and readout mechanism, wherein the information is stored on interchangeable plates which can be easily placed in the mechanism and removed therefrom so that a wide range of stored information can be read out without any change in the mechanism other than placing the plate having the desired information in its proper position.

More specifically, the invention contemplates a system embodying a plurality of information storage plates and a recording and readout mechanism which on the one hand may be operated to record or store information on any required number of the plates and on the other hand may be utilized for reading out the stored information.

Another object of our invention is to provide a mechanism as described in the paragraphs above, embodying an accurately calibrated comparison scale integral with each information plate the purpose of which is to increase the accuracy of the readings taken from the information plate.

Still another object of our invention is to provide a circuit which will automatically maintain the light source of the optical system at a proper brightnes.

Other objects will become apparent in the ensuing specifications and appended drawing in which:

Fig. 1 is a schematic representation of the basic storage and readout mechanism, omitting the comparison and illumination control units;

Fig. 2 is a schematic representation of a storage plate of the system, carrying data consisting in a multiplication table;

Fig. 3 is a detail sectional view of one of the data responsive motors and mirror actuated thereby;

Fig. 5 is a diagram of the photocell bridge; and

*Basic system—Fig. 1*

Figure 4:
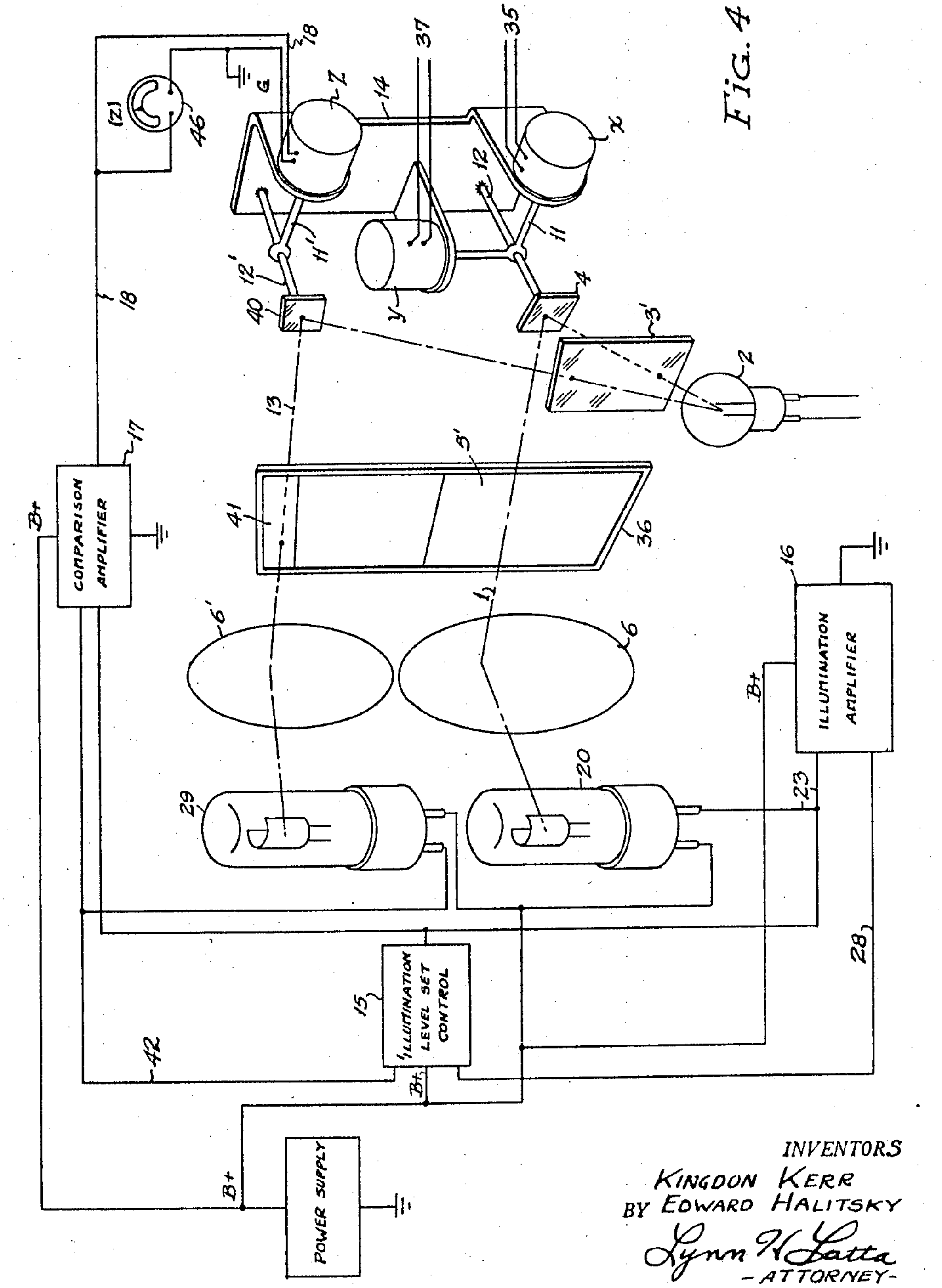
Fig. 4 is a schematic representation of the entire system.

Referring now to the drawing in detail, we have shown in Fig. 1 thereof, as an example of one form in which the invention may be embodied, a simple form of our storage and readout system embodying, in general, an electrically operated control unit indicated generally at A, for deflecting a light beam 1 as it is passed through an information storage plate 5; and a reading unit B which gives a series of readings varying with the density at various points on the surface of plate 5. Control unit A includes separate controls for determining positions of intersection of plate 5 by beam 1 along X and Y axes respectively, whereby the combination of controls may determine positions of intersection over the entire area of the plate.

Fig. 1 represents the means by which data is selected and retrieved from the system. A light beam 1 from light source 2 and masked to a small diameter by a suitable masking device 3 (e.g. apertured plate or equivalent optical unit) is deflected by the movable mirror 4 onto the information plate 5. The light beam is attenuated by the local precalculated density on the plate and, through a collecting lens 6 is caused to impinge on a photosensitive cell 7 resulting in an electrical voltage output. This output voltage, which will vary in accordance with the local density at any point on the plate and which may be read from any suitable voltage indicator, represents the value of the stored information (Z).

*The information plate—Fig. 2*

Fig. 2 shows the information plate which is made of rigid or semi-rigid translucent material and is characterized by light and dark areas much like a photograph. These light and dark areas represent specific information which is stored on the plate, the degree of darkness (density) corresponding to the information value. Each local area of density on the plate is given an "address" or a locating position on the face of the plate. This address may be designated in linear dimension from the bottom and one edge or in any manner desired. For example: if each local area measures $1/10$ of the plate dimensions, then the horizontal and vertical dimensions of the plate may be divided into 10 divisions and so designated. The horizontal axis can then be referred to as the X axis and the vertical as the Y axis, following the cartesian coordinate system. A local area of information designated as X–6, Y–7 would exist at a point on the surface of the plate $6/10$ of the horizontal plate width from the left hand side, and $7/10$ of the vertical dimension from the bottom edge. A plate having local information areas the dimensions of which are $1/10$ the X and Y plate dimensions would therefore contain $10\times10$ or 100 separate information areas. The local information areas may be square as indicated in Fig. 2, and each may have substantially uniform density within its individual margins, so that the aggregate information area is composed of a finite number of independent local areas each having its own information value differing from that of its neighbors in a stepped relation as contrasted to an overall information area varying density in infinitely small increments. These areas may be smoothed to form a nearly continuous flow of information when moving from one address point to another on the plate. The smoothing just referred to may be attained, for example, in the readout operation by using a scanning spot of twice the diameter or width of the light beam spot that was used in recording the information originally. Thus where the recording spot would exactly blanket one local unit information area, the readout spot, having a width twice the unit area width, would blanket four adjoining local information areas and thus would respond to the average density of the four areas rather than the density of any one individual area. Using the previous example of storage of a simple multiplication table, the X and Y dimensions (or addresses) are used for the multiplier and multiplicand, while the local density at the address point is used as the product. Thus, if the table includes all values to 10×10 the local densities will include representative values from 0 to 100. If the darker areas represent increasing values of the product, then the plate will gradutae, step by step, from clear in the lower left hand corner to very dark in the upper right hand corner. In a similar manner any data, theoretical or otherwise, which can be represented by any function of (X, Y) can be stored on the plate.

*Method of making the plate*

Considering the plate as being coated with a photo sensitive emulsion, like a photographic film, the local areas of density may be derived by exposure of the area to light and processed in the usual photographic manner. By using a source of light concentrated into a very small spot and capable of being moved to any point on the surface of the plate, a means of exposing any area of the surface is obtained. The density obtained on exposure to the light spot will depend upon the brilliance of the light and the time of exposure. Both of these items are controllable, within limits, such that a density of predetermined value may be obtained at will. To make a complete plate, therefore, of say 100 points, 100 separate addresses will be involved including both X and Y at each address. At each of the 100 addresses, then, an exposure is made relating to the density value (Z). At the completion of this operation the plate is processed (developed) and the resulting plate serves as a permanent storage of the information contained. Physical methods of selecting the address points may be obtained by either moving the plate, in relation to a fixed light spot, by mechanical means, or moving the light spot by electrical, or mechanical means. Density control may be obtained by varying the time of exposure, intensity of the light spot or both. Variations of the above methods can be realized with non-photographic materials through the use of vacuum deposit of metals on a base carrier, cutting a block of semi-transparent material to the proper thickness (density) in the local areas, chemical etching of local areas, molding semi-transparent gelatine to the proper contour or otherwise.

*The beam deflecting unit*

Fig. 3 shows in detail the construction and operation of the "X" and "Y" motors included in Fig. 1. These two motors (indicated by reference letters X and Y respectively) are identical, each consisting of a permanent magnet 8, a pole piece structure 9 containing a moving coil 10 to which is attached a drive rod 11 connected to a cantilever spring 12, carrying a mirror 4. Said cantilever spring is rigidly attached at one end to support 14 and is free for motion at its opposite end to which the mirror is attached. Operation of said motors is effected as follows: When an electric current flows in the moving coil 10 a magnetic repulsion or attracting force is developed in the coil due to the presence of the magnetic field, generated by the magnet 8. The direction of the force is determined by the direction of current flow in the coil 10. The magnitude of the force is determined by the strength of the magnetic field and the current flow in the coil. The force thus generated is applied from the coil 10 to the drive rod 11, which in turn, is applied to the cantilever spring 12, causing it to flex to a position where the returning force of the spring is equal to that of the coil and drive rod. As the cantilever spring 12 bends, the mirror 4 will be deflected and within limits of a uniform magnetic field and deflection of the spring below the yield point, mirror deflection will be proportional to coil current. A beam of light striking the mirror will therefore be deflected through an angle proportional to coil current. By the use of two such motors, as shown in Fig. 1, and attached to a single cantilever spring and mirror, a beam of light may be deflected in two directions simultaneously by supplying currents to each of the two moving coils.

*Improved form utilizing error signal—Fig. 4*

Fig. 4 shows a refinement of the simple system shown in Fig. 1. The elements which have been added are designed to overcome certain inaccuracies which are inherent in the simple system. These refinements are designed to:

(1) Reduce the effects (errors) of a changing light intensity due to changes in the source voltage or aging of the light unit itself.

(2) Reduce the effects (errors) in manufacturing, processing and aging of the information plate.

(3) Reduce the effects (errors) due to a change in sensitivity of the photocells caused by changes in the source voltage, temperature and aging.

Refinements to the simple system of Fig. 1 consist of a means by which only difference signals are applied in the system, instead of absolute values. These difference signals are generated by comparing the light intensity on the information plate to that on a calibrated scale of the same character as the information plate. The resulting difference signal is then independent of illumination intensity, photocell sensitivity or absolute value of density.

Fig. 4 shows a practical system using this method. A single, common, light source 2, operating at an illumination level set on a control 15, is viewed by a photocell 20 along the optical path 1 extending through the information storage area 5' of a plate 36. A second photocell 29 views the same light source through the comparison scale 41 of plate 36, along a corresponding optical path 13 reflected by a mirror 40. The mirror 40 is mounted on a cantilever spring 12' which is fixed to a support 14', and a comparison motor Z, similar in construction to motors X and Y, operates a drive rod 11' to deflect mirror 40 on a single axis. Optical paths 1 and 13 are in the form of thin pencil light beams passing through spaced masking apertures in a plate 3'. The difference output (error signal) between the two photocells is integrated in an electronic servo 17 which we prefer to call a comparison amplifier, and is applied to the mirror deflection drive motor Z, which seeks a density on the calibration scale which is the same as that of the information point. It follows, therefore, that when these two densities are equal, the integrated error (or calibration scale position) represents the output (Z) and is a linear function of the density at the information point X, Y.

A further refinement, to compensate for possible differences and nonlinearities of the photocells with different values of light, consists of a second circuit involving an illumination level electronic servo 16 which we will refer to as an illumination amplifier. The purpose of this device is to maintain a proper light level at the photocells and thereby obtain a fixed operating point for each cell.

Figure 6:
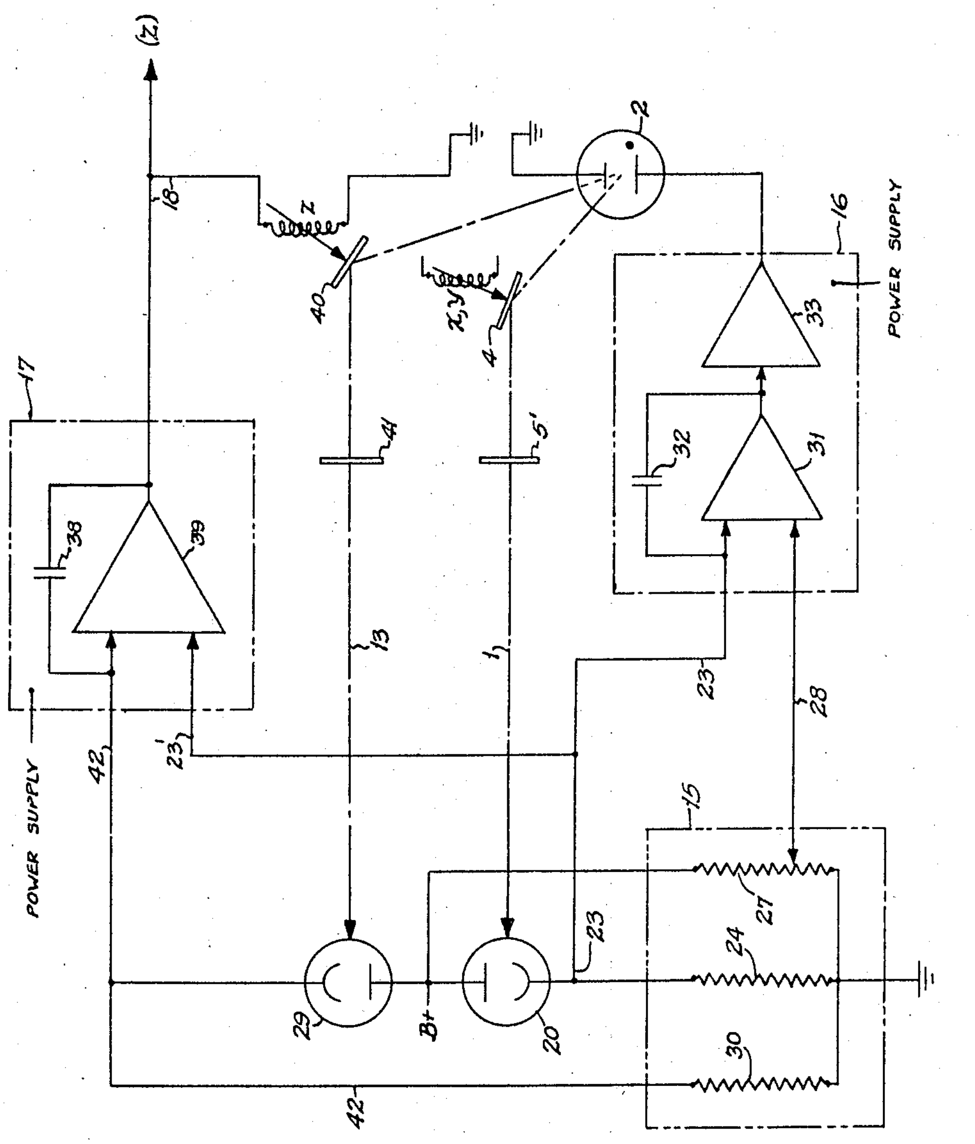
Fig. 6 is a diagram of the system.

*Electronic components—Figs. 5 and 6*

Fig. 6 is a schematic diagram of the system of Fig. 4, in which photocells 20 and 29 and illumination control 15 form parts of a balanced dual bridge circuit in which there are two bridges, each consisting of four arms, as in the common Wheatstone bridge, each arm being a resistive element. Fig. 5 shows the same bridge circuit is more conventional bridge diagram form. One bridge embodies arms 21 and 22 which are combined in a single potentiometer 27 in which the ratio of resistance 21 to resistance 22 can be varied by the potentiometer slider 28. Resistance 20 consists of the photocell 20 whose resistance value depends upon the quantity of intercepted light. Resistance 24 (photocell load resistance), is of fixed value and completes the primary bridge of the system (represented by the right half of Fig. 5). Supply voltage is applied to both bridges at connections 25 and 26 with the grounded end at connection 25. Current flowing through the primary bridge divides through the potentiometer and the leg containing photocell 20. Voltage output from the bridge is taken between junctions 28 and 23. When the ratio of resistances of the potentiometer equals that of the photocell and resistance 24 the bridge is balanced and no output will appear at the junctions described above. Also the voltages from ground to junction 28 and from ground to junction 23 will be equal. The bridge may be unbalanced by changing the potentiometer slider position or by changing the light level, and thereby changing the resistance of the photocell. Upon unbalance, polarity of the bridge output will change depending upon which resistance is changed and in which direction. For example, an increase of light on the photocell 20 (decrease in resistance) will cause the bridge output to become positive at junction 23 with respect to junction 28. During normal operation the bridge is balanced at some light level representing an arbitrary operating point of the system. If, for any reason, the light level reaching the photocell changes (due to changes in the light source, or interposition of an information plate) the bridge becomes unbalanced producing an error signal having both amplitude and sign. This error signal is integrated and amplified in the illumination amplifier 16 to control the light source. The light source will then increase or decrease in brightness in such a way as to cancel the error until the photocell again reads the same intensity as at the initial set point.

A second bridge, comparison bridge, containing both photocells 20 and 29, and the two resistances 30 and 24, is used for comparing light level densities of the information plate and calibration scale. Operation is as before, in that the light received by both photocells must be equal to balance the bridge. The combination can, therefore, be termed a "dual bridge." The first part of the dual bridge (primary) containing the information plate photocell 20 is composed of potentiometer 27, resistance 24 and photocell 20 with output at junctions 28 and 23. The second part (comparison bridge) of the dual bridge consists of information plate photocell 20, calibration scale photocell 29, resistances 30 and 24 with output at junctions 42 and 23.

As both photocells are combined in a dual bridge and fed from a common voltage supply, error signals (difference voltages) are not generated by changing voltages in the power supply system. Similarly, as both integrators, light source and the comparison scanner are contained within closed loop servo systems, their final outputs at null will be unaffected by voltage or supply variations.

Illumination amplifier 16 is a two-stage amplifier including a differential amplifier 31 which responds differentially to inputs delivered through connection 28 (to the slider of potentiometer 27) and connection 23 (to junction between photocell 20 and load resistor 24). The output of amplifier 31 (a difference, or "error" signal) is fed into a power amplifier 33 which delivers an amplified signal to the light source 2 for variably activating the same. A condenser 32 is connected across the photocell input and the output of differential amplifier 31, as shown.

Comparison amplifier 17 comprises a single stage differential amplifier unit 39 responding to inputs from the master photocell output connection 23 (through a branch connection 23') and from the comparison photocell 29 (through a connection 42). A condenser is connected across amplifier unit 39 between the comparison photocell output connection 42 and the output connection 18.

The output signal (Z) of comparison amplifier 17, through connection 18, is fed to one side of comparison motor Z, the other side of the motor being grounded at G. Thus motor Z is controlled by the error signal developed in comparison amplifier 17.

*Operation—Illumination balancing*

The detailed operation of the circuit shown in Fig. 6 is as follows: Light received by photocell 20 establishes a cell resistance and allows B+ current to flow to ground through resistance 24. A voltage will therefore be derived at the junction of the cell and the load resistor 24 depending upon the amount of light received by cell 20. Current will also flow through cell 20 into the differential amplifier 31 through input 23, charging the condenser 32 and producing an amplified voltage at the output. Similarly, current will flow through the illumination level potentiometer 27 and produce a second voltage at the input 28 to amplifier 31. As these two inputs produce counter voltages in the output of amplifier 31 only the difference voltage will appear as a charge on the condenser 32 and as an amplified output. This resulting voltage is amplified in the current (power) amplifier 33 and applied to the light source (glow discharge tube) 2. The changing voltage causes proportionately changing current which, in turn, causes proportionately changing intensity of the light source 2. This changing light is transmitted back to photocell 20 with a fed-back action and the above process is repeated until a level is reached where the two input voltages to the differential amplifier 31 are the same and therefore cancel one another. At this time the resulting charge on condenser 32 will hold the light source 2 at a constant level of intensity and balanced or "nulled" to the value set on potentiometer 27. Any change in light source intensity, whether caused by leakage at condenser 32, gain change in amplifier 33, power supply, aging of the light source or attentuation of the light to photocell 20 will cause an error voltage to be generated and the system will again adjust itself to a balance. At balance, the resistance of photocell 20 will be equal to the resistance of the upper portion of potentiometer 27, which is fixed for any setting and hence causes the photocell 20 to operate at a fixed point of resistance (i.e. light level) or fixed point of operation in its light vs. resistance characteristic curve.

*Operation—Density comparison*

Operation of the density comparison portion of the system is similar in that photocell 29 views the same light source 2 and, due to corresponding optical paths, is illuminated with the same intensity of light as photocell 20. Load resistors 30 and 24 form a second bridge having photocells 20 and 29, which are identical, as its other arms. As the load resistors 30 and 24 have identical values, the resistance of photocells 20 and 29 are equal when the bridge is balanced. This is the exact case when the intensity of illumination is the same on both photocells. If, however, light beam 1 is attenuated, for example, by a dense region of the information area 5' and light beam 13 is not, different intensities of light will exist on the two photocells and the unbalanced bridge will produce an output causing the condenser 38 to charge and an output voltage will thereby appear at amplifier 39. This output voltage is then applied to comparison motor Z, causing light beam 13 to swing across the variable density calibrated scale 41 in such a way as to attenuate the light received by photocell 29, reducing the output from the bridge. Action will proceed until both photocells receive the same intensity of light at which time the beam 13, driven by the motor Z, will come to rest at a point on the calibration scale 41 equal in density to that which was introduced in light beam 1 by the information area 5'. Lead wire 23' interconnects the primary bridge and the differential amplifier input 23, thereby balancing both bridges to the common setting of potentiometer 27. The voltage then appearing at (Z) represents the output of the system (information stored at a specific point on the information plate 36).

If the calibration scale 41 is made in such a manner that its light transmission characteristics are identical with those of the information area 5' and that the light transmission varies linearly with one dimension of the plate and the electrical input-beam deflection output characteristics of the drive motor are linear, the voltage appearing at the output of amplifier 39 will be linearly related to the density existing on the information plate 36 interposed in the light beam 1. This will occur regardless of non-linearities in light transmission characteristics, amplifiers, light source photocells or other parts of the system. Similarly, changes in the power supply voltage, amplifier gain, temperature, aging or tube substitution will not affect the null or balance and hence will not change the output voltage (Z) for any given point being read on an information plate.

With condenser 32, illumination amplifier 16 constitutes a differential integrator. While the comparison amplifier 17 is shown in Fig. 6 as a simple one stage differential integrator, in many cases it will be preferable to utilize a power stage of amplification at the output of amplifier 39 in an arrangement substantially the same as that shown in unit 16.

We find that the invention is adaptable to embodiment in a form wherein the aggregate information area may be as small as 1½ inches in width and height (although it is to be understood of course that we do not intend to restrict the invention to the use of an area that small or that large). Where the area is of this size, and of the number of divisions indicated above, the light beam is converged to a width of approximately .015 inches for the example given. The light beam may be an expanding one from its source to the aperture in mask element 3, and the latter may embody a lens 45 for condensing the light beam along a converging path from the mask 3 to the mirror 4 and thence to its terminus at photocell 7. The beam may have a width of e.g. ¼ inch at mirror 4 and the mirror may be restricted to a quarter inch square, although other sizes can likewise be employed.

The circuits indicated at 35 and 37 in Fig. 4 are utilized for variably exciting the coils 10 of motors X and Y in order to produce controlled deflection of beam 1 along both X and Y axes for completely scanning the information area 5'. As shown in Fig. 1, the amount of electric power applied to the motors X and Y may be controlled manually by rheostats 43, 43' operating to vary the amount of power delivered by sources 44, 44' to the respective motors, thus developing electro-magnetic fields of varying strength in the coils 10, and deflecting the springs 12 to correspondingly varying extent. The rheostats 43, 43' can be calibrated so as to be directly related to the individual sections of information area 5 or 5', whereby a position on a rheostat may directly indicate a corresponding position on an X or Y axis of area 5.

Instead of manual control of motors X and Y, the output signals of one or more electronic computers may be fed directly into these motors, or the output signals of automatic sensing instruments of various types may be fed into the motors for causing the apparatus to respond automatically to changing X and Y conditions that are being sensed by such instruments, and to immediately give the (Z) value as the answer to a problem involving the X and Y conditions.

The illumination control unit 15 of Fig. 4 may be taken as including the portions of the bridge circuit collectively indicated at 15 in Fig. 6, the control instrument being the potentiometer 27, 28 in which the slider 28 may be manually settable.

The calibration scale 41 can be provided with calibration indicia whereby the position of intersection thereof by light beam 13 may be read directly on this scale by visual reading, for the (Z) value reading. Alternatively, the integrated error delivered by comparison amplifier 17 may be read on a suitable meter 46 responding to the (Z) output of amplifier 17, and the scale of meter 46 may read in terms such as to give the (Z) reading directly.

*Equivalents*

With respect to the invention as disclosed in Fig. 6, the movement of the light spot in its scanning operation may be affected either mechanically (as by using the reflecting mirrors illustrated herein) or by electrical means. In this respect, the invention contemplates the use of well-known cathode ray tube mechanism, as the equivalent of the light source, the mirrors and the mirror deflecting motors herein illustrated. Such cathode ray tube equivalent mechanism is not illustrated herein for the reason that it is well known and it will be readily understood from the following explanation, how it can be substituted for the mirrors 4 and 40, the light source 2 and the motors X and Y. For example, in thus substituting a conventional cathode ray tube unit, a screen of the tube, where the electron beam is converted into visible light, may be regarded as the equivalent of light source 2; the light rays projected therefrom will be converted into beam form by a means such as the aperture plate 3 or 3' or an objective lens; the deflection of the beam, instead of being effected by reflection after passing through the aperture plate, will originate in deflection of the electron beam within the tube, with a scanning of the tube screen on X and Y axes. Light emission coming from a spot thus moving from point to point on the tube screen, will produce a bundle of diverging beams, one of which is selected by the aperture and has a deflection path depending upon the line of projection from the spot on the screen through the aperture (the deflection on the far side of the aperture plate being in inverted relation to that of the beam section that extends from the light spot on the screen to the aperture). In such substituted mechanism, the conventional deflection plates or coils of the cathode ray tube correspond to the X and Y motors; and conventional electrical controls for these deflector plates or coils will correspond generally to the controls 43 and 43' of Fig. 1. To take the place of the mirror 40 and motor Z in Fig. 4, a second cathode ray beam may be utilized. For example, a conventional twin-gun cathode ray tube may be employed with one cathode beam providing the source for beam 1 and the other cathode beam providing the source for beam 13, and with the deflector plates or coils of the second beam corresponding to the motor Z of Fig. 4.

In the appended claims the term "deflector means" is used to embrace either the reflector mirrors disclosed in the drawings hereof or the electronic deflector equivalent thereof, as in the cathode ray tube structure equivalent as explained above.

We claim:

1. In an information storage and readout system, in combination: an information storage unit having light transmitting areas of varying light-arresting density to represent primary information arranged along X and Y and having a comparison light transmitting scale arranged on a Z axis; means to project primary and secondary light beams; a primary reflector arranged to reflect said primary beam through said primary information light transmitting area; a secondary reflector arranged to reflect said secondary beam through said comparison scale; controllable means to tilt said primary reflector in respective X and Y directions for deflecting the reflected beam so as to scan said light transmitting areas on said X and Y axes; a primary photosensitive element arranged to receive the reflected primary beam; a comparison photosensitive element arranged to receive the reflected secondary beam; an electric motor operable to tilt said secondary reflector in a manner to deflect said secondary beam linearly for scanning said comparison scale; means responsive to the output of said comparison element for actuating said motor to seek a position in which said secondary beam is directed through said comparison scale at a point where the density thereof is in a predetermined relation to the density of said primary information light transmitting area at the point of intersection thereof by said primary beam; and means responsive differentially to the electrical outputs of said photosensitive elements for indicating a composite of the values of deflection of said primary light beam.

2. In an information storage and readout system, in combination an information storage unit having light transmitting areas of varying light-arresting density to represent primary information arranged along X and Y and having a comparison light transmitting scale arranged on a Z axis; means to project primary and secondary light beams; a primary reflector arranged to reflect said primary beam through said primary information light transmitting areas; a secondary reflector arranged to reflect said secondary beam through said comparison scale; a pair of controllable devices cooperable to tilt said primary reflector in respective X and Y directions for deflecting the reflected beam so as to scan said light transmitting areas on said X and Y axes; a primary photosensitive element arranged to receive the reflected primary beam; a comparison photosensitive element arranged to receive the reflected secondary beam; a third motor device operable to tilt said secondary reflector in a manner to deflect said secondary beam linearly for scanning said comparison scale; means responsive to the output of said comparison element for actuating said third motor; and means providing a feedback coupling between said comparison element and said primary photosensitive element to indicate readings of the densities of said light transmitting area as the result of light intensity modulation of the reflected light beam after passing through said storage unit, whereby to indicate a composite of the values of deflection of said reflected beam along said X and Y axes.

3. In an information storage and readout system, in combination with an information storage unit having light transmitting areas of varying light-arresting density to represent primary information arranged along X and Y axes: a comparison light transmitting scale of varying density arranged on a Z axis; means to project primary and secondary light beams; a primary reflector arranged to reflect said primary beam through said primary information light transmitting areas; a secondary reflector arranged to reflect said secondary beam through said comparison scale; a pair of motor devices cooperable to tilt said primary reflector in respective X and Y directions for deflecting the reflected beam so as to scan said light transmitting areas on said X and Y axes; a primary photosensitive element arranged to receive the reflected primary beam; means sensitive to the electrical output of said photosensitive element to vary the light intensity of the primary light beam; a comparison photosensitive element arranged to receive the reflected secondary beam; a third motor device operable to tilt said secondary reflector in a manner to deflect said secondary beam linearly for scanning said comparison scale; and means responsive to the output of said comparison element for actuating said third motor to seek a light intensity on said comparison scale corresponding to that at the point of intersection of said storage unit by said primary light beam, whereby to indicate the product of the values of deflection of said reflected beam along said X and Y axes.

4. In an information storage and readout system, in combination: an information storage unit having light transmitting areas of varying light-arresting density to represent primary information arranged along X and Y and having a comparison light transmitting scale of varying density arranged on a Z axis; a common light source; means to direct primary and secondary light beams therefrom; a primary reflector arranged to reflect said primary beam through said primary information light transmitting area; a secondary reflector arranged to reflect said secondary beam through said comparison scale; a pair of motor devices cooperable to tilt said primary reflector beam so as to scan said light transmitting areas on said X and Y axes; a primary photosensitive element arranged to receive the reflected primary beam; a comparison photosensitive element arranged to receive the reflected secondary beam; a third motor device operable to tilt said secondary reflector in a manner to deflect said secondary beam linearly for scanning said comparison scale; means responsive differentially to the outputs of said comparison and primary photosensitive elements for actuating said third motor to seek a light intensity on said comparison scale corresponding to that at the point of intersection of said storage unit by said primary light beam and thereby to indicate a composite of the values of deflection of said primary beam along said X and Y axes; and means sensitive to the electrical output of said primary photosensitive element to vary the light intensity of said primary beam by controlling said light source.

5. In an information storage and readout system, in combination: an information storage unit having light transmitting areas of varying light-arresting density to represent primary information arranged along X and Y and having a comparison light transmitting scale of varying density arranged on a Z axis; a light source; means to direct primary and secondary light beams therefrom; a primary reflector arranged to reflect said primary beam through said primary information light transmitting areas; a secondary reflector arranged to reflect said secondary beam through said comparison scale; a pair of motor devices cooperable to tilt said primary reflector in respective X and Y directions for deflecting the reflected beam so as to scan said light transmitting areas on said X and Y axes; a primary photosensitive element arranged to receive the reflected primary beam; means sensitive to the electrical output of said photosensitive element to control said light source so as to vary the light intensity of the light beams; a comparison photosensitive element arranged to receive the reflected secondary beam; a third motor device operable to tilt said secondary reflector in a manner to deflect said secondary beam linearly for scanning said comparison areas; means coupling said comparison element to said primary photosensitive element to modify the output of said comparison element; and means responsive to the modified output of said comparison element for actuating said third motor so as to seek a light intensity on said comparison scale corresponding to that at the point of intersection of said storage unit by said primary light beam, whereby to indicate a composite of the values of deflection of said reflected beam along said X and Y axes.

6. In an information storage and readout system, in combination: an information storage unit having light transmitting areas of varying light-arresting density to represent primary information arranged along X and Y and having a comparison light transmitting scale of varying density arranged on a Z axis; a common light source; means to direct primary and secondary light beams therefrom; a primary reflector arranged to reflect said primary beam through said primary information light transmitting areas; a secondary reflector arranged to reflect said secondary beam through said comparison scale; a pair of motor devices cooperable to tilt said primary reflector in respective X and Y directions for deflecting the reflected beam so as to scan said light transmitting areas on said X and Y axes; a primary photosensitive element arranged to receive the reflected primary beam; means sensitive to the electrical output of said primary photosensitive element to vary the light intensity of said primary beam by controlling said light source; manually operable means to set a selected range of light intensity operation of said light source; a comparison photosensitive element arranged to receive the reflected secondary beam; a third motor device operable to tilt said secondary reflector in a manner to deflect said secondary beam linearly for scanning said comparison scale; and means responsive to the output of said comparison element for actuating said third motor to seek a light intensity on said comparison scale corresponding to that at the point of intersection of said storage unit by said primary light beam, whereby to indicate a composite of the values of deflection of said reflected beam along said X and Y axes.

7. In an information storage and readout system, in combination: an information storage unit having light transmitting areas of varying light-arresting density to represent primary information arranged along X and Y and having a comparison light transmitting scale of varying density arranged on a Z axis; a common light source; means to direct primary and secondary light beams therefrom; a primary reflector arranged to reflect said primary beam through said primary information light transmitting areas; a secondary reflector arranged to reflect said secondary beam through said comparison scale; a pair of motor devices cooperable to tilt said primary reflector in respective X and Y directions for deflecting the reflected beam so as to scan said light transmitting areas on said X and Y axes; a primary photo-sensitive element arranged to receive the reflected primary beam; beams sensitive to the electrical output of said primary photosensitive element to vary the light intensity of said primary beam by controlling said light source; a comparison photosensitive element arranged to receive the reflected secondary beam; a third motor device operable to tilt said secondary reflector in a manner to deflect said secondary beam linearly for scanning said comparison scale; means responsive to the output of said comparison element for actuating said third motor to seek a light intensity on said comparison scale corresponding to that at the point of intersection of said storage unit by said primary light beam; dual bridge means coupling said comparison element to said primary photosensitive element to modify the output of said comparison element; and manually operable means to set said dual bridge means for a selected range of light intensity operation of said light source.

8. In an information storage and readout system, in combination: an information storage unit having light transmitting areas of varying light-arresting density to represent primary information arranged along X and Y and having a comparison light transmitting scale of varying density arranged on a Z axis; a common light source; means to direct primary and secondary light beams therefrom; a primary reflector arranged to reflect said primary beam through said primary information light transmitting areas; a secondary reflector arranged to reflect said secondary beam through said comparison scale; a pair of motor devices cooperable to tilt said primary reflector in respective X and Y directions for deflecting the reflected beam so as to scan said light transmitting areas on said X and Y axes; a primary photosensitive element arranged to receive the reflected primary beam; a comparison photosensitive element arranged to receive the reflected secondary beam; a third motor device operable to tilt said secondary reflector in a manner to deflect said secondary beam linearly for scanning said comparison scale; a bridge including said primary element, said comparison element and balancing resistances; means utilizing the output of said bridge for actuating said third motor to seek a light intensity on said comparison scale corresponding to that at the point of intersection of said storage unit by said primary light beam whereby to indicate a composite of the values of deflection of said reflected beam along said X and Y axes; a second bridge including said primary photosensitive element and one of said balancing resistances; and means utilizing the output of said second bridge to vary the light intensity of said light beams by controlling said light source.

9. A system as defined in claim 8, wherein said second bridge includes a potentiometer providing two legs thereof, said potentiometer being adjustable to set a selected light intensity range for operation of said source.

References Cited in the file of this patent

UNITED STATES PATENTS

| | | |
|---|---|---|
| 2,415,190 | Rajachman | Feb. 4, 1947 |
| 2,415,191 | Rajachman | Feb. 4, 1947 |
| 2,463,534 | Hawkins | Mar. 8, 1949 |
| 2,463,785 | Lubcke | Mar. 8, 1949 |
| 2,497,042 | Doll | Feb. 7, 1950 |
| 2,653,185 | Lubcke et al. | Sept. 22, 1953 |